US005507697A

United States Patent [19]

Ledvina et al.

[11] Patent Number: 5,507,697
[45] Date of Patent: Apr. 16, 1996

[54] MINIMAL PIN PROJECTION ROLLER CHAIN

[75] Inventors: Timothy J. Ledvina, Groton; Philip J. Mott, Dryden, both of N.Y.

[73] Assignee: Borg-Warner Automotive, Inc., Sterling Heights, Mich.

[21] Appl. No.: 434,975

[22] Filed: May 4, 1995

Related U.S. Application Data

[63] Continuation-in-part of Ser. No. 361,432, Dec. 21, 1994, which is a continuation-in-part of Ser. No. 131,473, Oct. 4, 1993, Pat. No. 5,427,580, which is a continuation-in-part of Ser. No. 885,194, May 19, 1992, abandoned.

[51] Int. Cl.⁶ .................................................. F16H 7/00
[52] U.S. Cl. .............................................. 474/85; 474/231
[58] Field of Search ............................... 474/231, 84–89

[56] References Cited

U.S. PATENT DOCUMENTS

| | | | |
|---|---|---|---|
| 2,196,479 | 4/1940 | Sloan | 474/89 |
| 2,245,925 | 6/1941 | Klaucke | 474/89 |
| 2,316,131 | 4/1943 | Cardwell | 474/88 X |
| 2,936,654 | 5/1960 | Wilson | 474/88 X |
| 3,029,654 | 4/1962 | Hill | 474/158 |
| 3,412,623 | 11/1968 | Gritt | 474/88 X |
| 3,931,706 | 1/1976 | McKeon et al. | 74/350 R |
| 4,036,072 | 7/1977 | McKeon et al. | 74/245 R |
| 4,186,617 | 2/1980 | Avramidis et al. | 74/245 S |
| 4,342,560 | 8/1982 | Ledvina et al. | 474/157 |
| 4,440,023 | 4/1984 | Landenberger | 474/85 X |
| 4,642,074 | 2/1987 | Phillips | 474/156 |
| 4,758,210 | 7/1988 | Ledvina | 474/212 |
| 4,973,293 | 11/1990 | Kuehl | 474/85 X |
| 5,226,856 | 7/1993 | Iacchetta et al. | 474/207 |
| 5,427,580 | 6/1995 | Ledvina et al. | 474/84 |

FOREIGN PATENT DOCUMENTS

| | | |
|---|---|---|
| 2-76944 | 3/1990 | Japan . |
| 3-28348 | 3/1991 | Japan . |
| 5-17251 | 3/1993 | Japan . |

*Primary Examiner*—Roger J. Schoeppel
*Attorney, Agent, or Firm*—Willian Brinks Hofer Gilson & Lione; Greg Dziegielewski

[57] ABSTRACT

A roller chain assembly has pins extending through the outer links with minimal projection beyond the outside edge of the outer links. The minimal pin projection provides a chain assembly of narrow construction.

16 Claims, 2 Drawing Sheets

MINIMAL PIN PROJECTION ROLLER CHAIN

This application is a continuation in part of U.S. application Ser. No. 08/361,432, filed Dec. 21, 1994, entitled Chain Assemblies With Minimal Pin Projection, the subject matter of which is incorporated herein by reference, which is a continuation in part of U.S. application Ser. No. 08/131,473, filed Oct. 4, 1993, entitled "Phased Chain Assemblies," now U.S. Pat. No.5,427,580, the subject matter of which is incorporated herein by reference, which is a continuation in part of U.S. application Ser. No. 07/885,194, filed May 19, 1992, now abandoned, the subject matter of which is also incorporated herein by reference.

BACKGROUND OF THE INVENTION

The present invention relates generally to power transmission chains. The invention has particular application to power transmission chains of the roller chain variety, which are used primarily in automotive engine timing applications, but also can have automotive applications in the transfer of power from a torque converter to a transmission or in a transfer case of a four-wheel drive vehicle.

One type of chain is known as "roller chain". A typical roller chain consists of alternate inner links and outer links. The inner links, which are also known as "bushing" links, consist of spaced sidebars with bushings tightly received in openings, or apertures, at each end of the sidebars. The outer links, which are also known as "pin" links or "guide" links, consist of spaced sidebars with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. Examples of roller chain are found in U.S. Pat. Nos. 4,186,617 and 5,226,856, which are both incorporated herein by reference.

Roller chain drives can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

In conventional roller chain, outside links or pin links are press fit on the pins. The pins typically extend out beyond the edges of the outside links in the transverse direction of the chain, i.e., the direction transverse to the longitudinal movement of the chain around the sprockets.

As explained below, in one embodiment of the present invention, the pins are flush with the outside edges or sides of the outside links or pin links, or are constructed for minimal projection from the sides of the outside links. Minimization of the projection of the pins allows a narrower chain construction and permits embodiments where the outer links of two chains in side-by-side relation may be combined in a single assembly, or may be in contacting relation. Additionally, in another embodiment, the pins of two adjacent chains are in a contacting relationship, or the pins of one chain contact the sides of the outside links of the adjacent chain.

The present invention has particular application to chain assemblies in which the chains and sprockets are offset, or phased, to modify the impact noise spectrum and chordal action noise spectrum. In a phased chain system, a single chain assembly is divided into, or replaced by, two side-by-side chains that are phased or offset typically by one-half pitch. In one embodiment of the present invention, the minimal pin projection is utilized on the sides of the two chains that are in the side-by-side relationship. Running the two chains in a side-by-side and touching relationship, allows the achievement of a narrower phased chain system than in certain phased chain systems of the prior art.

A conventional roller chain drive is comprised of an endless roller chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. Various types of engine timing systems and configurations, which are suitable for roller and inverted tooth chain assemblies, are also shown in U.S. application Ser. No. 08/131,473, filed Oct. 4, 1993, now U.S. Pat. No. 5,427,580 which is incorporated herein by reference.

Noise is associated with chain drives. Noise is generated by a variety of sources, but in roller chain drives it can be caused, in part, by the impact sound generated by the collision of the chain and the sprocket at the onset of meshing. The loudness of the impact sound is affected by, among other things, the impact velocity between the chain and the sprocket and the mass of chain rollers contacting the sprocket at a particular moment or time increment.

Many efforts have been made to decrease the overall noise level and pitch frequency noise distribution in automotive chain drives to minimize the objectionable effects of the pure sonic tones. Several of those efforts are discussed in the above-mentioned U.S. application Ser. No.08/131,473, filed Oct. 4, 1993. The present invention finds application along with some of the noise reduction concepts discussed in the above-mentioned application, including randomization and phasing of the chain assemblies. However, the present invention has broader applications to chain systems that include, for example, non-phased sprockets.

Phasing the chain and sprocket relationship can reduce the number of chain rollers (or mass) impacting the sprocket during a given time increment. Similarly, phasing the chain and sprocket relationship can alter or phase the chordal action or articulation of the chain and sprocket.

However, in the narrow chain assembly package requirements that are particularly found in modern engine timing systems, the use of a phased chain system can be difficult in that the single chain is often replaced by two chains that are placed in side-by-side and phased relation. The need to place two phased chains in side-by-side relationship in the same width previously occupied by a single chain requires elimination of some links or use of thinner links. Such a modification is disadvantageous in that it uses fewer links across the width of the chain, or thinner links across the chain, which generally results in a weaker chain assembly than the assembly with a greater number of links across the width of the chain.

Phased chain systems as well as side-by-side non-phased chain systems are conventionally constructed with the two chains in a spaced-apart relationship. The spacing is provided between the two chains to assure that the chains do not contact one another during operation. In high speed automotive applications, significant movement occurs in the portions of each chain that span the longitudinal space between the driving and driven sprockets of each assembly. The separation between the two chains in the transverse direction is provided to prevent any contact between the two chains during such movement. Clearances between the chain and other structures are typically recommended in order to avoid contact from longitudinal or transverse movement of the chain during operation. The separation distance between the chains also contributes to the size or overall width of the chain package.

As noted above, the present invention utilizes pins that are constructed for minimal projection from the sides of the chains. An example of a roller chain that utilizes welded side bars to avoid extension of the pins beyond the edge of the outside links is shown in U.S. Pat. No. 4,036,072 to McKeon et al. In the McKeon et al. chain, the ends of the pins are welded in abutting relationship with the inner faces of the side bars.

An example of a phased roller chain system is disclosed in U.S. Pat. No. 3,029,654 to Hill. In the Hill patent, three roller chains are placed in a side-by-side but offset or phased relationship. The three chains are shown with pins that project transversely from the links. The three chains are shown in a spaced-apart relationship in the transverse direction, which avoids contact between the chains and the pins.

Another example of a phased roller chain system is disclosed in Japanese publication no. 3-28348 (application no. 1-51359) to Kawakami. In the Kawakami system, four chains are placed in side-by-side relationship, but offset or phased by one-quarter pitch. The Kawakami reference teaches that the chains are not connected to one another, but are independent. While FIG. 3 of Kawakami appears to disclose contact between the pins on adjacent chains, this contact may be only an incidental contact in view of Kawakami's teaching of independent chains. Moreover, on account of the one-quarter pitch offset, the pins do not nest within each other and do not contact the links of the adjacent chain. The Kawakami chain construction is very similar to the system shown in Japanese publication no. 5-17251 (application no. 3-90363).

A third example of a phased roller chain system is disclosed in Japanese publication no. 2-76944 (application no. 63-227318) to Fukumoto. The Fukumoto application discloses two phased roller chains that are interconnected by protruding pins. FIG. 2 of Fukumoto illustrates the chains in a close relationship, while FIG. 4 of Fukumoto illustrates the chains further apart, but still interconnected by protruding pins. Fukumoto teaches interconnection of the two chains and does not show the chains in an unconnected or independent relationship.

SUMMARY OF THE INVENTION

The present invention relates to a chain assembly in which the pins are placed in the chain assembly with minimal projection beyond the outside links of the chain. That is, the pins are preferably flush or do not project beyond the edge of the outside links on at least one side in the transverse direction of the chain. To the extent the pins extend beyond the outside links, the extension is preferably limited to less than 50% of the thickness of the outside or outermost link, or more preferably, less than 10% of the thickness of the outside or outermost link.

In one embodiment of the present invention, a phased chain system includes two chains in side-by-side but offset or phased relation. The projection of the pins is limited on the sides of the two chains that are in side-by-side relationship. The minimal projection of the pins may allow the pins as well as the outside links of the chains to be in a touching or contacting relationship. This touching or contacting relationship dramatically differs from the prior art assemblies in which contact between side-by-side chains was avoided.

As a result of the pins being substantially flush against the links, or projecting only a minimal distance beyond the outside edges of the links, the two side-by-side chain assemblies may be placed close together and the outside links of the two chains are in contact with each other. By close placement of the two chains, the overall system achieves a narrower width.

The pins are placed flush with the outside link by driving the pins in a direction toward the center of the chain. Alternatively, the aperture may be slightly relieved on the outside of the chain so that the pin may seat in the aperture. The pin may be placed asymmetrically with respect to the transverse direction of the chain so that the pin extends a greater amount from one side of the chain than from the other side of the chain.

The pin need not be flush with the outside of the link, but should preferably not extend very far outward in the transverse direction of the chain. In one embodiment the projection of the pin is limited to less than 50% of the thickness of the innermost link. (The term "innermost link" is used to define the link on the side of the chain that, for example, is in side-by-side relation with an adjacent chain. In non-phased system, or in systems without side-by-side chains, either side of the chain may be defined as the "inner" side that includes an "innermost link.") In a more preferred embodiment, the projection of the pin is limited to less than 10% of the thickness of the innermost link.

The present invention provides several advantages in decreasing the width of the chain assembly. In the small package sizes necessary for modern automotive engine timing chains, the elimination of the spacing between the two chains in the phased chain system provides a package size advantage.

The present invention also provides a novel form of packaging the two chains in a side-by-side relationship. In conventional chain systems, the two side-by-side chains are placed in a spaced apart relationship, with specified clearances, in order to avoid any contact between the two chains from longitudinal or transverse movements of the chain. In the present invention, the two chains are placed in a contacting or touching relationship so that each chain will contact the other chain. Such an approach is contrary to the conventional teachings of avoiding contact.

The present invention has particular application with phased chain assemblies or systems. That is, high speed automotive transmission, transfer case or engine timing systems in which the sprockets are split into two portions or separate assemblies and the sprocket portions are offset or phased with respect to one another, with single or multiple chains.

Each of these embodiments, as well as certain other embodiments, may include a plurality of chain assemblies, including assemblies of two, three, or four chain strands. Additionally, the sprockets may be phased ¼, ⅓ or ½ tooth, as well as various other amounts of pitch. Likewise, the chain assemblies may be phased by ¼, ⅓ or ½ pitch, or other amounts of pitch.

In each chain assembly, the links are interleaved to form sets of links. Each link includes a pair of apertures, with an aperture from one set of links being aligned for interlacing with an aperture from an adjacent set of links. Pivot members, in the form of round pins or rocker joints, are utilized to connect the adjacent sets of links through the apertures, and to allow pivoting of the sets of links with adjacent sets. In the roller chains, the links are interconnected and the sprocket is contacted by either rollers or bushings.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale.

DETAILED DESCRIPTION OF THE PREFERRED EMBODIMENTS

Figure 1:
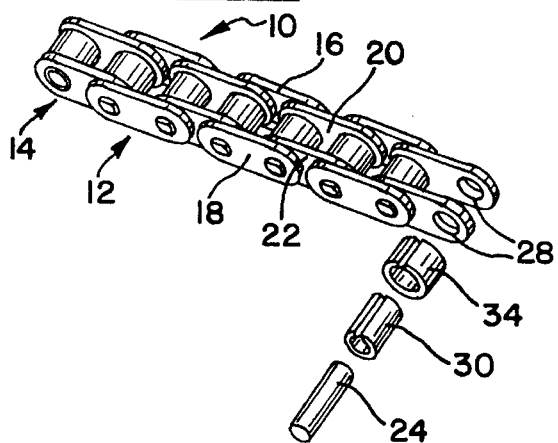
FIG. 1 is a perspective view of a roller chain of the prior art shown partly in exploded view.

Turning now to the drawings, FIG. 1 illustrates a portion of the chain of the prior art generally at 10. The chain is constructed by a series of links, pins, bushings and rollers. The chain includes a series of interleaved outer links 12 and inner links 14, which are shown more clearly in FIG. 3. The outer links are formed by a pair of outer link plates 16, 18, or sidebars. The inner links are likewise formed by a pair of inner link plates 20, 22.

The outer link plates 16, 18 are fixed to a pair of pins 24, 26. The pins are spaced apart and fitted through apertures 28 in the outer link plates. The pins are typically secured in the outer link plates by a press fit, or welding, caulking or any other means known in the art.

The inner link plates 20, 22 are fixed to a pair of bushings 30. The bushings are generally cylindrical in shape and spaced apart and fitted through apertures 28 in the inner link plates. The bushings are typically secured in the inner link plates by a press fit, or by welding, caulking or any other means known in the art.

The bushings are mounted about the pins and are freely rotatable about the pins. Thus, rotation of the bushings about the pins allows pivoting of the outer links with respect to the inner links. In the prior art chain shown in FIG. 1, rollers 34 are mounted about the bushings and are freely rotatable about the bushings. The rollers are generally cylindrical in shape and contact the sprocket teeth. In the prior art chain shown in FIG. 2, the bushings directly contact the sprocket.

Figure 2:
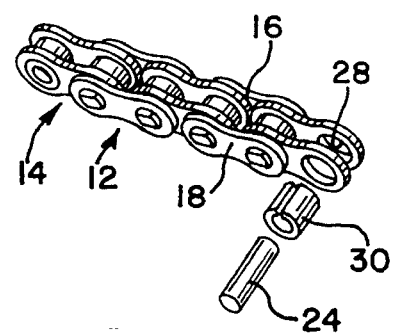
FIG. 2 is a perspective view of a roller (bushing) chain of the prior art shown partly in exploded view.
Figure 2A:
FIG. 2A is a plan view of a stepped bushing that is an alternative embodiment of the bushing of FIG. 2.

A stepped bushing 31 is shown in FIG. 2A. The stepped bushing 31 has a larger outside diameter, which engages the sprocket, and a reduced outside diameter, which is press fit in the link plates.

Thus, the chain of FIG. 1 is constructed by inserting the pin within the bushing and the bushing within the roller. The bushings and rollers are generally formed with a split, as shown in FIGS. 1 and 2. The bushings are then secured to a pair of inner link plates and the pins are then secured to a pair of outer link plates. The inner links and outer links are alternated in series to form an endless chain. The length of the chain and exact number of links is determined by, among other things, the application and center distance between the sprockets.

The rollers of the chain contact the teeth of the sprocket. The rollers seat in the root between the sprocket teeth. The outer links and inner links are constructed so that the teeth of the sprocket can be received between the link plates and between the rollers.

Figure 4:
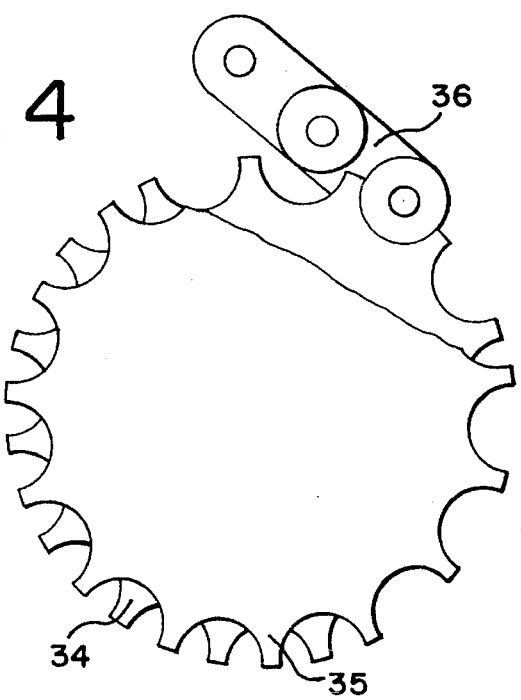
FIG. 4 is an illustration of a side view, partially broken away, of a portion of a roller chain contacting one sprocket of a pair of phased sprockets.
Figure 5:
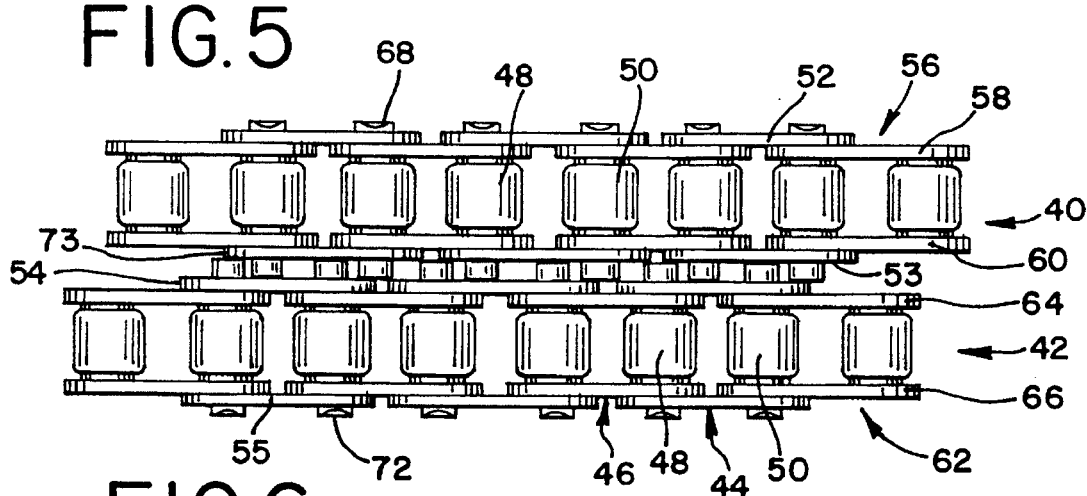
FIG. 5 is a top view illustration of a portion of a pair of phased roller chains having the minimal pin projection feature of the present invention.

The present invention is directed to providing a chain with pins set for minimal projection in the transverse direction of the chain. FIG. 5 illustrates a pair of phased chains 40, 42 in a side-by-side relationship. The two chains include guide links 44, or outer links, along their outsides and inner links 46 that have rollers 48, 50 for driving contact with the sprockets. The two sprockets are phased or offset by approximately one-half pitch. A pair of phased sprockets for roller chain are shown in FIG. 4.

Figure 3:
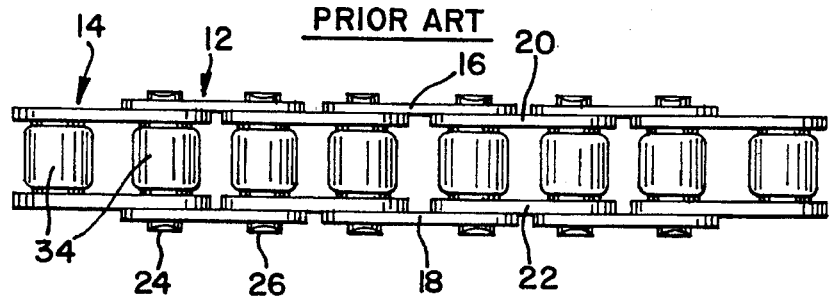
FIG. 3 is a plan view of a roller chain of the prior art illustrating the protrusion of the pins beyond the edges of the outside links.

In the prior art chain assembly shown in FIG. 3, the pins 24, 26 project outward from the sides of the chain assembly at both sides of the chain. The pins are generally symmetric (within manufacturing tolerances) with respect to the transverse direction of the chain. Two phased chains in prior art constructions are typically in a separate and spaced apart relationship. The spacing is provided to prevent contact of the guide links of one chain with the guide links of the adjacent chain.

FIG. 5 illustrates a pair of phased chains that utilize the minimal pin projection feature of the present invention. As seen in FIG. 5, the two chains include outer links or pin links that are located along the outside of each of the chains. The outer links are formed by pairs of link plates and the inner links are also formed by pairs of link plates. In the embodiment of FIG. 5, the outer links of each chain 40, 42, have outer link plates, 52, 53 on chain 40 and plates 54, 55 on chain 42.

Thus, inner link 56 on chain 40 has inner link plates 58, 60, and inner link 62 on chain 42 has inner link plates 64, 66. The contact between the two chains is accomplished by extending the pin from one chain to the link plate of the adjacent chain. Thus, pin 68 of chain 40 will extend to plate 54 of chain 42. In similar manner, pin 72 of chain 42 will extend to plate 73 of chain 40.

The "edge" of the outer link plate is the flat surface on the side of the link plate in the transverse direction of the chain. The distance between the two edges is the thickness of the link plate. The thickness is shown, for example, in FIGS. 3, 5, and 6. The pins are allowed to project beyond the outside edges of the same outer link plates. The pins are press fit into outside link plates in conventional fashion.

A first embodiment of the present invention is therefore shown in FIG. 5. In that embodiment, each chain includes both outer links 44 and inner links 46 and rollers 50 for contacting the sprocket teeth. The two chains are in side-by-side relationship and phased or offset by one-half pitch. Accordingly, the sprockets for the two chains will also be in side-by-side relationship and phased by one-half tooth. Phased sprockets are shown in FIG. 4.

In the embodiment shown in FIG. 5, the pins are allowed to extend beyond the outer link plates on both sides of each of the two chains. In this embodiment, the pins from one chain are nested between the pins on the other chain. In this manner, the pins from one chain are allowed to contact the link plates from the other chain, and the nesting allows a narrower width for the chains, The offset of one-half pitch permits nesting of the pins. In other words, the pins of one chain are located between the pins of the other chain. While the pins are shown extending a distance beyond the edge of the link plates in FIG. 5 for purposes of illustration, the pin may extend out a much smaller distance in order to reduce the package size of the chain system and take advantage of the teachings of the present invention.

Figure 6:
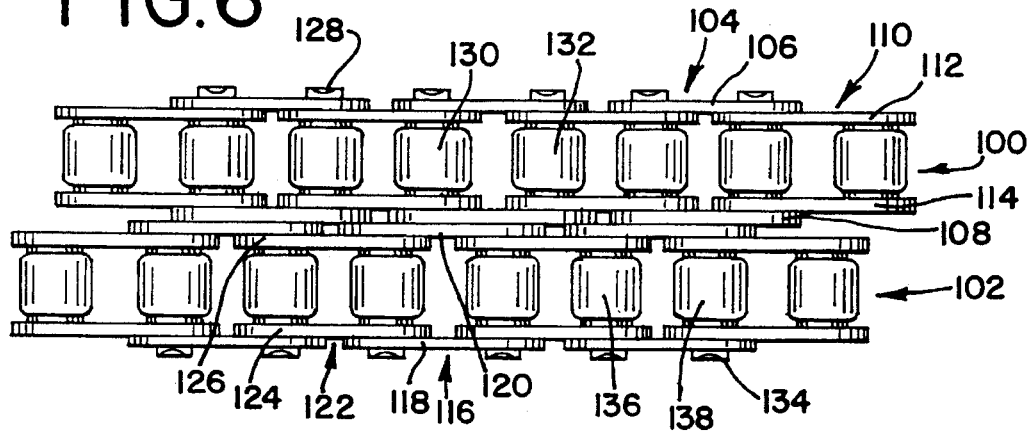
FIG. 6 is an illustration of a top view of a portion of a pair of phased roller chains having the minimal pin projection feature of the present invention.

Another embodiment, shown in FIG. 6, is similar to the previous embodiment, but includes touching or contact of link plates for both chains. Thus, the two chains 100, 102, are independent but contact each other by their other link plates. Chain 100 includes outer links 104, which have pairs outer link plates 106, 108, and inner links 110, which have pairs of inner link plates 122, 114. Similarly, chain 102 includes outer links 116, which have pairs of outer link plates 118, 120, and inner links 122, which have pairs of inner link plates 124, 126.

Chain 100 also includes pins 128 and rollers 130, 132. Similarly, chain 102 includes pins 134 and rollers 136, 138. The pins 128 of chain 100 are limited in their projection beyond the edge of outer link plate 108 of the side of the chain nearest chain 102. Similarly, the pins 134 of chain 102 are limited in their projection beyond the edge of outer link plate 120 of the side of the chain nearest chain 100. However, those pins can extend outward for some distance toward the adjacent chain and still allow touching between the link plates of the two chains.

The fit of the pins into the outer links to achieve minimal pin projection is accomplished in any of a number of possible manners. Three methods of manufacture are illustrated in FIGS. 7, 8 and 9. Of course, other of manufacture are possible and the invention is not limited to the methods illustrated and described here.

Figure 7A:
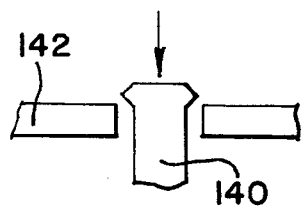
FIG. 7A is a schematic illustration of a method of manufacture of the present invention in which the pin is driven from the position in FIG. 7A to the position in FIG. 7B where it is substantially flush with the outside edge of the link.
Figure 7B:
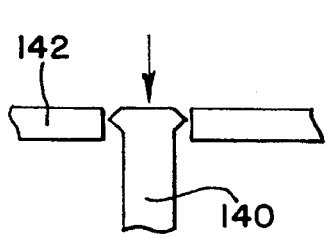
Figure 8:
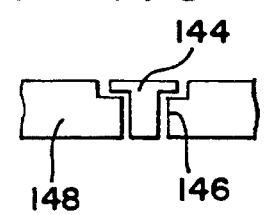
FIG. 8 is a schematic illustration of a method of manufacture of the present invention in which the pin is set in a recess in the aperture of the link.

In the method illustrated in FIG. 7, the pin 140 is driven through the link 142 until it extends outside the outer link, as shown in FIG. 7A. After the head of the pin is riveted, then the pin is driven back into the link to the point where the desired projection is achieved, as shown in FIG. 7B. The pin head may extend beyond the end of the link, but preferably is substantially flush or possibly recessed into the link. The pin may be driven back into a recess in the aperture of the link, or may cause the link itself to plastically deform. In one embodiment, the pin extends out from the surface of the link by less than 10% of the thickness of the link. In another embodiment, the pin extends out from the surface of the link by less than 50% of the thickness of the link. While other amounts of projection are possible, the intent of the invention is to limit the projection of the pins in order to promote the advantages of the invention, which include, for example, the decrease in chain width.

When the pin is set in the link, the pin may be asymmetrically located with respect to the transverse direction of the chain. That is, the pin projects more to one side of the chain than to the other side across the width of the chain assembly.

A second method of manufacture is illustrated in FIG. 8. In that method, the pin 144 is driven into a recess in the aperture 146 in the link 148. The recess is sufficient to allow the maintenance of the above-described desired relationships of pin projection from the edge of the link. The amount of the recess in the aperture is exaggerated in FIG. 8.

Figure 9A:
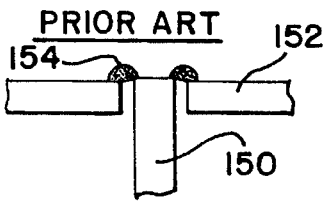
FIG. 9A is a schematic illustration of a welded pin in the prior art and FIG. 9B is a schematic illustration of a method of manufacture of the present invention in which the pin is welded in a recessed position in the aperture.
Figure 9B:
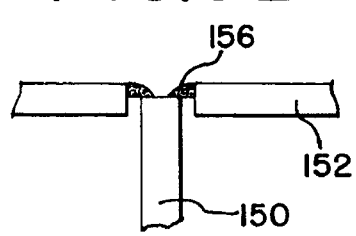

A third method of manufacture is illustrated in FIG. 9. In that method, the pin 150 is recessed in the aperture and a weld 154 is placed over the pin to maintain its position in the link 152. As shown in FIG. 9A, welding is used in conventional links of the prior art to maintain the pin in the link, but the weld 154 also projects outward from the link. In the present invention, as shown in FIG. 9B, the weld 156 is located in the recess between the top of the pin and the outside edge of the link and thus the projection of the weld beyond the outside edge of the link is minimized. Other means of bonding or securing the pin, such as chemical treatments, are also contemplated by the present invention.

Thus, the minimal pin projection feature of the present invention allows two chains of a system to be placed in a narrower width package by placing the chains in closer side-by-side proximity. In one embodiment, the outer links on the innermost side of the two side-by-side chains are allowed to contact one another during operation of the chain system. Alternatively, the minimal pin projection feature of the present invention allows placement of a chain with a greater number of links across the chain in the same width package as the prior art chain. By placing the two chains in closer proximity, a greater number of links can be placed across the chain. A greater number of links across the width of the chain typically provides a chain of greater strength than a chain of fewer number of links placed across the width of the chain.

In another embodiment, the links of one chain can be narrower than the links of the other chain, which allows two chains in the phased system of different widths. The narrower chain is achieved by narrower inner and outer links.

The features of the present invention find application most prominently in the high speed chain applications for automotive engine timing and transfer case or transmission chains. Applications are possible with various timing systems configurations such as those shown in application Ser. No. 08/131,473, filed Oct. 4, 1993, now U.S. Pat. No. 5,427,580.

Two phased sprockets 34, 35, and a portion of a roller chain 36 are shown in FIG. 4. The sprockets are phased one-half pitch.

In the implementation of a phased system of the present invention, two phased roller chains may be substituted for a single roller chain system. For a standard 0.375 inch pitch roller chain, certain limitations on the chain are desired in order to obtain a successful phased roller chain drive. In particular, the following parameters are desired for a phased system as a substitute for a 0.375 inch pitch roller chain:

| Parameter in Inches for 0.375 in. Pitch Chain | Spec. Range per Chain | Best Method Single Chain | Phased Assembly Total (2 Chain) | Comparable 3SR Heavy Duty Chain |
|---|---|---|---|---|
| Pin Link Thickness | ≦0.030 | 0.026 | 0.100 | 0.090–0.100 |
| Bushing Link Thickness | ≦0.040 | 0.040 | 0.160 | 0.100–0.120 |
| Link Height | ≧0.330 | 0.350 | 0.350 | 0.325 |
| Roller Length | ≦0.125 | 0.120 | 0.240 | 0.225 |
| Roller Outside Dia. (Ref.) | | 0.250 | | 0.250 |
| Pin Dia. (Ref.) | ≦0.129 | 0.1125 | | 0.129 |
| Bearing Area (in 2) | | 0.0225 | 0.045 | 0.045 |
| Pin Length (Overall Chain Width) | ≦0.300 | 0.285 | 0.570 | 0.530–0.550 |

For a standard 8 mm pitch roller chain, certain limitations on the chain are desired in order to obtain a successful phased roller chain drive. In particular, the following parameters are desired for a phased system as a substitute for an 8 mm pitch roller chain:

| Parameter in Inches for 0.315 in. (8 mm.) Pitch Chain | Spec. Range per Chain | Best Method Single Chain | Phased Assembly Total (2 Chain) | Comparable 8 mm. Heavy Duty Chain |
|---|---|---|---|---|
| Pin Link Thickness | ≦0.026 | 0.020 | 0.080 | 0.080 |
| Bushing Link Thickness | ≦0.035 | 0.035 | 0.140 | 0.100 |
| Link Height | ≧0.300 | 0.305 | 0.305 | 0.307 |
| Roller Length | ≦0.120 | 0.110 | 0.220 | 0.182 |
| Roller Outside Dia. (Ref.) | | 0.222 | 0.222 | 0.222 |
| Pin Dia. (Ref.) | ≦0.120 | 0.100 | 0.100 | 0.120 |
| Bearing Area (in^2) | | 0.019 | 0.038 | 0.034 |
| Pin Length (Overall Chain Width) | ≦0.300 | 0.260 | 0.520 | 0.484 |

These parameters attempt to achieve the optimum chain drive for implementation of the present invention. The charts set forth the specified range ("Spec. Range per Chain") of each parameter for each of the two chains in the phased chain system. The preferred dimensions of each parameter ("Best Method Single Chain") are also set forth.

The phased chain system substitutes two side-by-side, but offset, chains for the single chain of prior art systems. Thus, a comparison is made between the preferred embodiment for two chains ("Phased Assembly Total (2 Chain)") and the typical single chain system of the prior art ("Comparable 3SR Heavy Duty Chain"). These parameters and comparative results are not intended to be limiting of the invention and are provided as examples of the present invention.

The package size for the two chains is limited by a number of factors. The pin length provides the overall chain width dimension. Thus, the total pin length of the two phased chains must fit within the package size or total pin width of a single chain of the prior art. For the 0.375 inch pitch roller chain, the preferred pin length is less than 0.300 inches, with the most preferred length being 0.285 inches.

The total width of the outer and inner links must fit within that pin length distance. Thus, the pin link (or outer link) thickness and bushing link (or inner link) thickness must be limited in conjunction with the roller length, but at the same time must be of sufficient thickness to provide adequate link strength. The thickness designated provides an increase thickness in the bushing links over the bushing links of the standard prior art chain, which is expected to provide benefits in resistance to fatigue.

For the 0.375 inch pitch chain, the link height is increased for the two chains in the phased system in order to provide greater strength in the narrower chain. The pin diameter is decreased for the two chains in the phased system on account of the lesser amount of load carried by the two chains in contrast to the load carried by the single prior art chain. The smaller pin diameter allows a roller with a greater wall thickness for the same roller outside diameter. The bearing area, which is the projected surface area between the pin and the bushing, is approximately the same for the two phased chains and the single chain of the prior art.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A roller chain assembly, comprising:

a series of interleaved inner and outer links, each outer link having a pair of outer link plates fixedly mounted to spaced pin members, each outer link plate having a pair of apertures for receiving said pin members;

each inner link having a pair of bushings mounted to turn on said pin members of said outer links, said inner links having inner link plates fixedly mounted to said bushings, each inner link plate having a pair of apertures for receiving said bushings;

each of said inner links and said outer links being adapted to receive a sprocket tooth;

said outer links having said pin members extending through at least a portion of said apertures of said outer link plates, said pin member extending from beyond an edge of a first outer link plate member to beyond an edge of a second outer link in said pair of outer link plates, said pin member extending a greater distance beyond said edge of said first outer link plate than the distance said pin member extends beyond said edge of said second outer link plate.

2. The chain assembly of claim 1 wherein said pin member is press fit within said outer link plate.

3. The chain assembly of claim 1 wherein said first outer link plate is of a first thickness, said pin member extending beyond said edge of said first outer link plate by an amount less than 10% of said first thickness of said first outer link plate.

4. The chain assembly of claim 1 wherein said first outer link plate is of a first thickness, said pin member extending beyond said edge of said first outer link plate by an amount less than 50% of said first thickness of said first outer link plate.

5. A roller chain assembly, comprising:

a series of interleaved inner and outer links, each outer link having a pair of outer link plates fixedly mounted to spaced pin members, each outer link plate having a pair of apertures for receiving said pin members;

each inner link having a pair of bushings mounted to turn on said pin members of said outer links, said inner links having inner link plates fixedly mounted to said bushings, each inner link plate having a pair of apertures for receiving said bushings;

each of said inner links and said outer links being adapted to receive a sprocket tooth;

said outer links having said pin members extending through at least a portion of said apertures of said outer link plates, said pin member extending from beyond an edge of a first outer link plate member only to a point within said apertures of said second outer link plate members.

6. The chain assembly of claim 5 wherein said pin member is substantially flush with the outside edge of said second outer link plate member.

7. A roller chain and sprocket assembly, comprising:

first and second roller chains, each of said chains having a plurality of interleaved sets of links, said chains being in side-by-side relationship around sets of sprockets, each chain having an inner portion that is located closest to the other chain and an outer portion located on the opposite side of said chain from said inner portion, each chain having pin members connecting adjacent sets of links, each link having a pair of apertures for receiving said pin members, each chain having some of said sets of links including rollers, each of said rollers being adapted to contact the teeth of a sprocket, the location of the rollers of said first chain being offset with respect to the rollers of said second chain, each of said chains having sets of outer links and inner links, said sets of outer links having a first outer link plate at said inner portion of said chain and a second outer link plate at an outer portion of said chain, said outer links having said pin members extending through at least a portion of said apertures of said outer link plates, said pin members extending from beyond an edge of said first outer link plate to beyond an edge of said second outer link plate in said sets of outer links, at least some of said pin members of said first chain contacting at least some of said first outer link plates of said second chain as said chains transverse said sprockets during operation.

8. The chain and sprocket assembly of claim 7 wherein said pin member extends a greater distance beyond said edge of said second outer link than the distance said pin member extends beyond said edge of said first outer link plate.

9. The chain and sprocket assembly of claim 8 wherein at least some of said first outer link plates of said first roller chain contact at least some of said first outer link plates of said second chain as said chains transverse said sprockets during operation.

10. The chain and sprocket assembly of claim 8 wherein said pin members of said second roller chain contact at least some of said first outer link plates of said first chain.

11. The chain and sprocket assembly of claim 7 wherein the location of the rollers of said first chain are offset with respect to the rollers of said second chain by an amount of one-half pitch of the chain.

12. The chain and sprocket assembly of claim 11 wherein said pin members of said first chain are nested between said pin members of said second chain.

13. The chain and sprocket assembly of claim 7 wherein said inner links of said first chain are narrower than said inner links of said second chain.

14. The chain and sprocket assembly of claim 13 wherein said outer links of said first chain are narrower than said outer links of said second chain.

15. The chain and sprocket assembly of claim 7 wherein said chain and sprocket assembly further comprises:

first and second driving sprockets connected to a driving shaft, said first and second driving sprockets having a plurality of spaced teeth, said driving sprockets being disposed in parallel relationship along said drive shaft, the location of said teeth of said first driving sprocket being circumferentially offset with respect to the teeth of said second driving sprocket, first and second driven sprockets connected to a driven shaft, said first and second driven sprockets having a plurality of spaced teeth, said driven sprockets being disposed in parallel relationship along said driven shaft, the location of said teeth of said first driven sprocket being circumferentially offset with respect to the teeth of said second driven sprocket, said drive shaft being operatively connected to a power input and said driven shaft being operatively connected to a power output, said first driving sprocket being aligned with said first driven sprocket and having said first chain drivingly connecting said first driving sprocket with said first driven sprocket, said second driving sprocket being aligned with said second driven sprocket and having a second chain drivingly connecting said second driving sprocket with said driven sprocket.

16. The chain and sprocket assembly of claim wherein said first and second driving sprockets are offset by approximately one-half pitch.

* * * * *